United States Patent [19]

Hobbs

[11] Patent Number: 4,902,449
[45] Date of Patent: Feb. 20, 1990

[54] EVAPORATIVE COOLER PAD AND METHOD OF FORMING SAME

[75] Inventor: Claude C. Hobbs, Waco, Tex.

[73] Assignee: Hobbs Bonded Fibers, Groesbeck, Tex.

[21] Appl. No.: 247,845

[22] Filed: Sep. 22, 1988

[51] Int. Cl.⁴ .......................... B01F 3/04; B32B 1/00; B32B 3/00
[52] U.S. Cl. ........................................ 261/94; 55/524; 55/528; 261/100; 428/71; 428/74; 428/76
[58] Field of Search ................... 55/524, 528; 261/94, 261/100; 428/71, 74, 76, 317.9

[56] References Cited

U.S. PATENT DOCUMENTS

| | | | |
|---|---|---|---|
| 2,244,097 | 6/1941 | Burkart | 428/74 |
| 2,391,558 | 12/1945 | Essick | 428/311.7 |
| 2,604,311 | 7/1952 | Summerhill | 261/97 |
| 2,610,893 | 9/1952 | Collins et al. | 261/94 |
| 2,637,540 | 5/1953 | Rowe | 261/94 |
| 2,720,909 | 10/1955 | Ehrlich | 428/247 |
| 2,829,732 | 4/1958 | Goettl | 55/233 |
| 2,879,197 | 3/1959 | Muskat et al. | 428/159 |
| 2,955,064 | 10/1960 | Frohmader | 261/94 |
| 3,034,772 | 5/1962 | Schulz | 261/94 |
| 3,059,312 | 10/1962 | Jamieson | 428/311.5 |
| 3,121,657 | 2/1964 | Magill | 428/311.9 |
| 3,126,428 | 3/1964 | Ash | 261/97 |
| 3,183,141 | 5/1965 | Holden et al. | 428/74 |
| 3,304,069 | 2/1967 | Palmer, Sr. | 261/94 |
| 3,395,900 | 8/1968 | Meek | 261/29 |
| 3,444,859 | 5/1969 | Kalwaites | 428/311.7 |
| 3,458,338 | 7/1969 | Adams et al. | 261/94 |
| 3,606,982 | 9/1971 | Anderson | 261/97 |
| 4,231,975 | 11/1980 | Peltier | 261/106 |
| 4,259,386 | 3/1981 | Wagstaffe | 428/159 |
| 4,302,495 | 11/1981 | Marra | 428/110 |
| 4,471,014 | 9/1984 | den Hartog et al. | 428/182 |
| 4,556,521 | 12/1985 | Baigas, Jr. | 261/94 |
| 4,649,000 | 3/1987 | Biesemeyer | 261/92 |
| 4,672,820 | 6/1987 | Goettl | 62/304 |
| 4,752,419 | 6/1988 | Sperr, Jr. et al. | 261/29 |

Primary Examiner—William J. Van Balen
Attorney, Agent, or Firm—Bell, Seltzer, Park & Gibson

[57] ABSTRACT

An evaporative cooler pad has opposing faces and is formed from a substantially noncompressible batt of substantially uniformly distributed natural cellulosic lightweight elongate segments such as aspen wood shavings. The segments are oriented in generally horizontal planes and extend in various directions with respect to each other to form interconnecting interstices and passageways throughout the pad. A preformed hydrophilic foam directly coats substantially all the surfaces of the individual segments. The coating is substantially less than the thickness of the segments so as to increase the cross-section of the segments without interconnecting the segments to each other and without bridging between the segments so that the interstices and passageways throughout the batt remain substantially intact. The foam has a minute cellular structure so that when contacted by water, the foam serves to wick the water along the surfaces of the pad and significantly increase the evaporative efficiency of the pad.

14 Claims, 1 Drawing Sheet

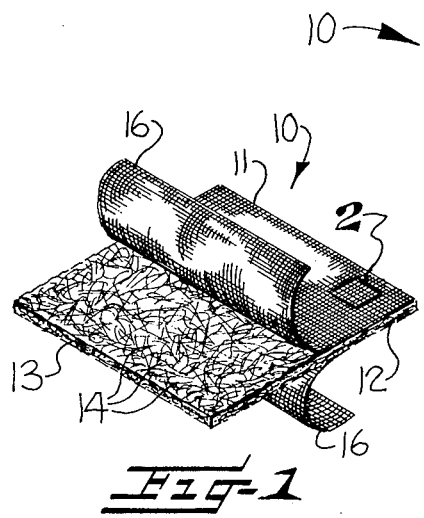
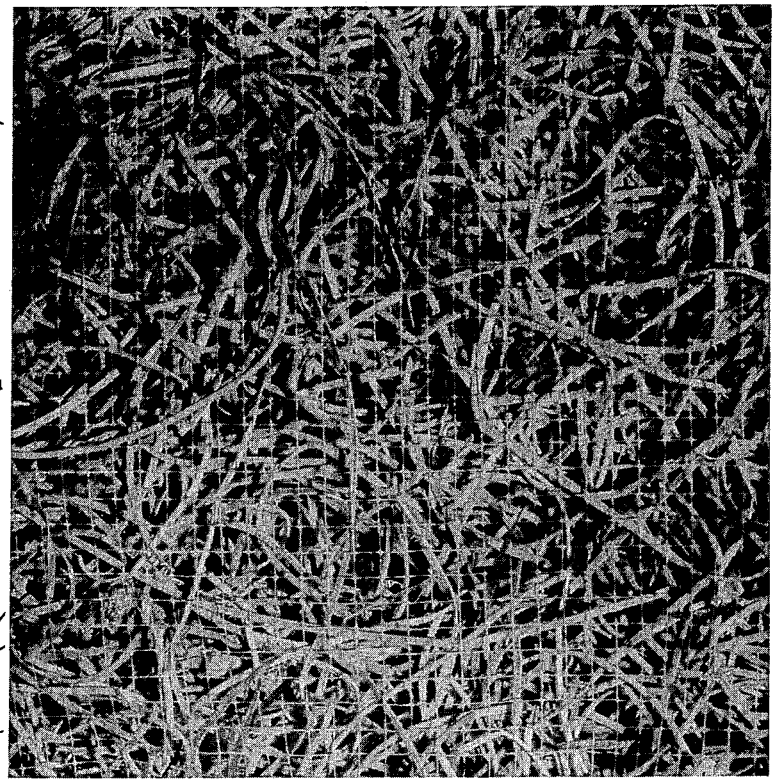
Fig-1
Fig-2
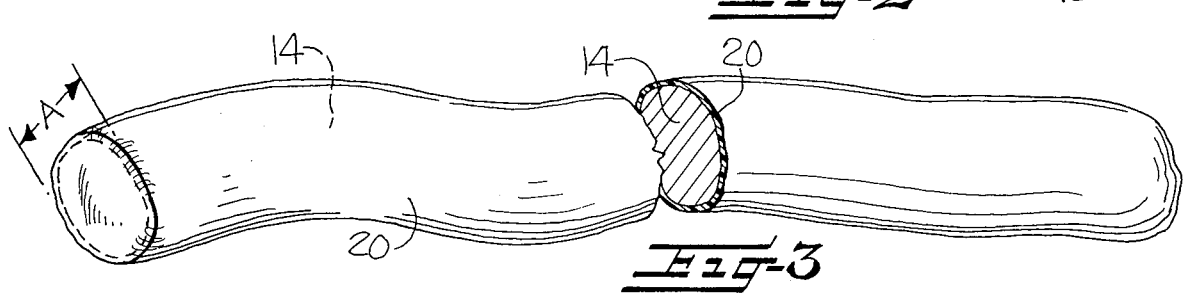
Fig-3
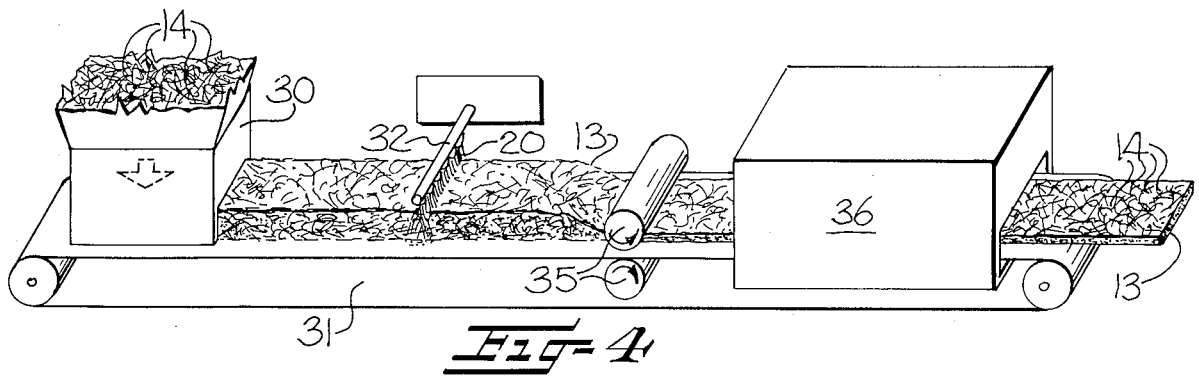
Fig-4
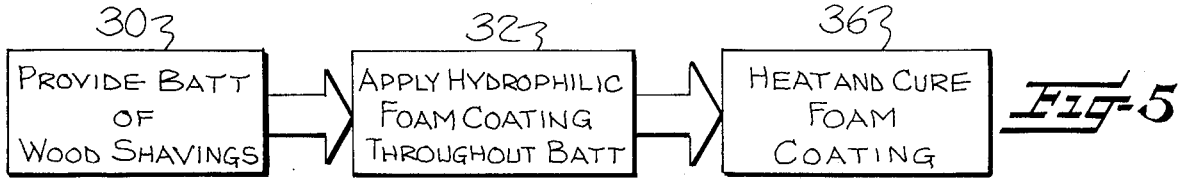
Fig-5

EVAPORATIVE COOLER PAD AND METHOD OF FORMING SAME

FIELD OF THE INVENTION

This invention relates to evaporative cooler pads and attendant methods of forming the pads and more particularly to an evaporative cooler pad having a preformed hydrophilic foam directly coating the surface of natural cellulosic lightweight elongate segments, such as aspen wood shavings, uniformly distributed in a substantially noncompressible batt.

BACKGROUND OF THE INVENTION

Evaporative cooler pads have been commercially used for many years as an economical substitute for air conditioning. Typically, a pad of wood shavings or other fibrous material is wetted while air is drawn therethrough. The passing air evaporates the water and cools the air for use in a residence or other building interior.

For years, the most commercially available pads were formed from a batt of natural cellulosic lightweight elongate segments such as aspen wood shavings. These pads not only could be produced efficiently and inexpensively, but also they retained an evaporative efficiency of up to fifty percent since the cellulosic elongate segments were hydrophilic.

A more recent evaporative cooler pad invented and marketed by the assignee of this invention and disclosed in U.S. Pat. No. 4,556,521 to Baigas, Jr. is now commercially available. This pad increases the evaporative efficiency of a cooler pad up to as high as eighty percent which is a marked improvement over prior pads made from natural cellulosic segments. A high loft batt of hydrophobic textile fibers such as polyester fibers are prebonded together and then coated with a preformed hydrophilic foam which substantially coats the bonded synthetic fibers of the batt and also bridges and spans random portions of the interstices and passageways of the batt to substantially increase the available surface area for contact by water. In addition, the preformed foam has a minute cellular structure which serves to produce a capillary type effect when contacted by water so that the water is wicked along the foam area to optimize the cooling efficiency of the pad. The foam acts to increase the evaporative efficiency of the batt from an essentially non-evaporative batt of hydrophobic fibers to an evaporative cooler pad having as high as about eighty percent evaporative efficiency.

Although these foam coated textile evaporative cooler pads have proved commercially successful, natural cellulosic evaporative cooler pads are still marketed and preferred by some because of their lower cost and market availability or an individual's preference. However, such natural cellulosic evaporative cooler pads are less efficient than the foam coated textile counterpart. If the thickness of the natural cellulosic pad is increased, the amount of evaporative cooling ability per square yard can be increased to give a cooling potential equal to the more efficient foam coated textile pads. This is possible, but not always desirable since shipment and handling is not facilitated by the increased thickness. In addition, the overall cost of the pad is increased. Also, some evaporative coolers may be designed to accept only thin pads making the use of thick natural cellulosic pads impractical.

With the foregoing in mind, it is the primary object of this invention to provide an evaporative cooler pad formed from natural cellulosic lightweight elongate segments which has an increased evaporative efficiency without substantially increasing the thickness of the pad.

It is another object of the present invention to provide an evaporative cooler pad formed from natural cellulosic lightweight elongate segments where the evaporative efficiency of the pad can be retained, but the pad can be produced to thinner dimensions.

It is another object of the present invention to provide an evaporative cooler pad formed from natural cellulosic lightweight elongate segments where the evaporative efficiency of the pad can be increased without restricting air flow through the pad.

It is still another object of this invention to provide a method of forming the aforesaid evaporative cooling pad.

SUMMARY OF THE INVENTION

These and other objects and advantages of the present invention are accomplished by an evaporative cooler pad with opposing faces and formed from a substantially noncompressible batt of substantially uniformly distributed natural cellulosic lightweight elongate segments, such as aspen wood shavings, which are oriented in generally horizontal planes extending substantially parallel to the opposing faces of the pad. The elongate segments in each plane extend in various directions with respect to each other and are formed from interconnecting interstices and passageways throughout the pad such that air directed toward the pad may flow generally freely therethrough from one face to the other of the pad.

The pad also includes a preformed hydrophilic foam directly coating substantially all the surfaces of the individual elongate segments to provide a coating thickness of substantially less than the thickness of the elongate segments. The coating also serves to increase the cross-section of the segments without interconnecting the segments to each other and without bridging between the segments so that the interstices and passageways throughout the batt remain substantially intact and unobstructed. In addition, the hydrophilic foam coating and its surface has a minute cellular structure which serves for producing a capillary type effect when contacted by water to wick the water throughout the pad along the surfaces of the elongate segments so as to substantially increase the evaporative efficiency of the pad over the pad prior to the coating thereof. An open mesh net fabric intimately engages the batt in surrounding relation to facilitate handling of the coated pad formed therefrom.

In the preferred embodiment, the hydrophilic foam coating surface is no greater than about 1 to 2 mils in thickness. At least 85% of the elongate segments are at least two inches in length with the majority of the elongate segments being within the range of three to eight inches in length. The weight of the uncoated batt is about 18 ounces per square yard and the weight of the applied foam is substantially less than the weight of the elongate segments.

BRIEF DESCRIPTION OF THE DRAWINGS

Some of the objects and features of the invention having been stated, others will become more apparent as the description proceeds, when taken in connection with the accompanying drawings in which:

FIG. 1 is a perspective view of the evaporative cooler pad in accordance with the present invention showing for illustrative purposes the open mesh net fabric partially removed from the batt of natural cellulosic lightweight elongate segments.

FIG. 2 is a photograph of the area enclosed by the numeral 2 in FIG. 1 showing in approximate actual size and in a plan view the evaporative cooler pad.

FIG. 3 is a cut-away perspective view of a wood shaving as used in the evaporative cooler pad of the present invention and showing the thickness of the applied hydrophilic foam layer relative to the thickness of the wood shaving.

FIG. 4 is an isometric drawing showing in schematic the method of manufacturing the evaporative cooler pad of the invention.

FIG. 5 is a schematic diagram of the method of manufacturing the evaporative cooler pad of the invention.

DETAILED DESCRIPTION OF THE INVENTION

Referring now to the drawings and more particularly to FIG. 1, there is shown the evaporative cooler pad 10 according to the present invention. The pad 10 has opposing faces 11, 12 and is formed from a substantially noncompressible batt 13 of substantially uniformly distributed natural cellulosic lightweight elongate segments which in the preferred embodiment are aspen wood shavings 14. Although many varieties of natural cellulosic segments, such as hay, stubble or other wood products may be used for the batt 13, aspen wood shavings are commonly used for the batts in evaporative cooler pads since aspen wood is inexpensive, easily acquired and amenable to manufacture into wood shavings.

As best seen in the photograph of FIG. 2, the wood shavings 14 are oriented in a generally horizontal plane extending substantially parallel to the opposing faces 11, 12 of the pad 10. The wood shavings 14 extend in various directions with each other and form interconnecting interstices and passageways throughout the pad 10 so that air which is directed toward the pad 10 may flow generally freely therethrough from one face to the other of the pad. Since the wood shavings 14 are crimped and twisted among themselves (FIG. 2), the structural integrity of the pad 10 is maintained. To facilitate handling of the pad 10 and assure that the pad integrity remains intact, an open mesh net fabric 16 intimately engages the batt in surrounding relation thereto. Preferably the net 16 is formed from polypropylene plastic material and has mesh openings 17 of about ⅛ inch to ⅜ inches square on each side, with 3/16×3/16 mesh openings as being conventionally used. A larger range of mesh openings would not adequately contain the wood shavings 14 since the larger openings would allow the wood shavings to pass therethrough while a smaller range of mesh openings may hinder complete impregnation of the batt 13 with a hydrophilic coating as will be described in detail hereafter.

At least 85% of the wood shavings 14 are at least two inches in length with the majority being in the range of three to eight inches in length. As best seen in the photo reproduction of the pad 10, the individual wood shavings 14 are relatively thin and have a cross-section thickness (A) of about 0.015 to 0.1 inches and depending on the type of shavings used, as high as 0.4 inches. In the preferred embodiment the wood shavings 14 range in cross-section thickness from about 0.015 to 0.025 inches. Smaller cross-sectioned wood shavings 14 would not exhibit sufficient strength and would break easily while larger cross-sectioned wood shavings would provide less surface area of contact per weight of shaving and decrease the evaporative efficiency of the pad 10. Preferably, the weight of the batt 13 is about 18 ounces per square yard without the added hydrophilic foam coating which will be explained later in detail. When the batt 13 is placed in a conventional evaporative cooling apparatus (not shown), based upon standard application tests the batt has an evaporative cooling efficiency of up to 50%. Although the batt of wood shavings is shown in FIG. 1 in a substantially square configuration, the batt can be cut and sized to any configuration to assure its adaptability to any commercially available evaporative cooling apparatus.

Referring now more particularly to FIGS. 2 and 3, the evaporative cooler pad according to the present invention also comprises a preformed hydrophilic foam 20 directly coating substantially all the surfaces of the individual elongate segments of aspen wood shavings 14. As best seen in the cross-sectional view of a wood shaving 14 shown in FIG. 3, the hydrophilic foam coating 20 has a thickness substantially less than the thickness of the aspen wood shaving so that the weight of the coating is substantially less than the weight of the shavings. It has been determined that 3 to 13 ounces per square yard of applied foam coating 20 on about a 1" thick batt is sufficient to give a coating thickness on the wood shavings 14 no greater than about 1 to 2 mil in thickness.

The applied hydrophilic foam coating 20 thus serves to increase the cross-section of the wood shavings 14 without interconnecting the aspen wood shavings to each other and without bridging between the shavings so that the interstices and passageways 15 throughout the batt 13 remain substantially intact and unobstructed. The preformed foam coating 20 thus creates substantially increased surface area of the shavings 14 so that the available surface area of the pad 10 for contact by water is accordingly increased. The preformed foam coating 20 also desirably has a minute cellular structure throughout including its surface which produces a capillary type effect when contacted by water. Thus, when the pad 10 of the invention is contacted by water in use, the foam coating 20 serves to wick the water along the foam coated wood shavings 14 to substantially increase the surface area of the pad 10 contacted by the water when the air is flowing through the pad. This optimizes the relative cooling efficiency of the pad 10 through maximum utilization of the pad 10 for water evaporation. Application tests in evaporative cooler installations (not shown) utilizing a pad about 1" thick have yielded an evaporative efficiency of approximately 75%, which is a 50% improvement of the evaporative efficiency over an uncoated pad.

The foam 20 generally comprises a vinyl acetate homopolymer emulsion, a polymeric acrylic emulsion, a foam stabilizer and water. More specifically, it has been found that a suitable foam may be composed of from about 50 to about 150 parts by volume of a vinyl acetate homopolymer emulsion, of from about 150 to about 50 parts by volume of a polymeric acrylic emulsion, of from about 5 to about 25 parts by volume of a foam stabilizer, of from about 0.5 to about 5 parts by volume of a rewettable wetting and dispersing agent, and from about 215 to about 200 parts of volume by water. As an optimum, the foam 20 is comprised of about 100 parts by volume of a vinyl acetate homopolymer, about 75 parts by volume of a polymeric acrylic emulsion, about 10 parts by volume of a foam stabilizer, about 3 parts by volume of a rewettable wetting and dispersing agent and about 100 parts by volume of water.

In the above formulations it has been determined that the vinyl acetate homopolymer may be a product designated UCAR Latex 130, available from Union Carbide Corporation. UCAR Latex 130 is a large particle size, relatively high molecular weight polyvinyl acetate homopolymer emulsion. The latex is stabilized with a hydroxylcellulose protective colloid giving it excellent mechanical and electrolytic stability. The polymeric acrylic emulsion may be a product designated Experimental Emulsion E-751, available from Rohm and Haas Company. Experimental Emulsion E-751 is a soft hydrophilic acrylic polymer emulsion which provides excellent wet strength. The foam stabilizer may be a product designated Ammonium Stearate 33%, available from Diamond Shamrock Corporation. Ammonium Stearate 33% is an effective foam stabilizer that functions as a primary or secondary foaming agent to develop relatively uniform cell structure. It disperses easily into water and is compatible for use with acrylic, vinyl chloride or nitrile latex emulsions. The rewettable wetting and dispersing agent may be a product designated Decerisol OT, available from American Cyanamid Company.

Insofar as the composition of the foam 20 is concerned, it has also been determined that latex emulsions other than vinyl acetate homopolymers may be used as the primary emulsifying ingredient of the foam. Other suitable ingredients include latex emulsions of styrene butadiene, nitrile and polyvinyl resins generally. When using these latter ingredients, however, it may be desirous to add a soap such as sodium laurel sulfate to aid foaming. Finally, if desired, it is possible to add inert fillers to some degree to the foam 20 to reduce the cost of same without significantly adversely affecting performance. Such inert fillers as clay or diatomaceous earth may be added to the degree that the foam composition can retain these particles and still carry out its intended function.

With regard to the manufacture of the pad 10, the preferred basic manufacturing process and sequence of steps are shown in FIGS. 4 and 5 of the drawings. The first step is to provide a batt of wood shavings. As shown in FIG. 4, a continuous batt can be formed by depositing from a hopper 30 wood shavings 14 onto an endless belt conveyor system 31. Such a system is conventional to the art and includes apparatus (not shown) for applying the open mesh net fabric in intimate engaging and surrounding relation to the formed batt 13.

Once the batt 13 is formed, it may be cut to proper dimensions and the hydrophilic foam coating 20 applied thereon, or as shown in the drawings, the foam coating can be applied throughout the batt in a continuous process. A nozzle system 32 sprays the hydrophilic foam 20 onto the formed batt 13. The batt 13 having the foam 20 applied thereon then passes through a set of nip rolls 35 which presses the batt 13 to distribute the foam therein. The foamed batt is then heated and cured in conventional heating apparatus 36 to form the desired evaporative cooler pad material which may be retained in rolls or cut into slabs of a desired size such as illustrated in FIG. 1.

There is thus provided by the invention an evaporative cooler pad 10 formed from conventional aspen wood shavings 14 which yields a relatively high cooling efficiency while being simple to construct and inexpensive. Not only can the evaporative efficiency of a pad filled with wood shavings be improved, but the relative thickness of a pad can be decreased without sacrificing any amount of cooling potential as compared to an uncoated pad filled with wood shavings.

The foregoing embodiment is to be considered illustrative rather than restrictive of the invention and those modifications which come within the meaning and range of equivalents of the claims are to be included therein.

That which is claimed is:

1. An evaporative cooler pad having opposing faces and comprising a substantially noncompressible batt of substantially uniformly distributed natural cellulosic lightweight elongate segments, oriented in generally horizontal planes extending substantially parallel to the opposing faces of the pad with the elongate segments in each plane extending in various directions with respect to each other and forming interconnecting interstices and passageways throughout the pad such that air directed toward the pad may flow generally freely therethrough from one face to the other of the pad, said pad also comprising a preformed hydrophilic foam directly coating substantially all the surfaces of the individual elongate segments, said hydrophilic foam coating having a thickness substantially less than the thickness of the elongate segments so as to increase the cross-section of the segments without interconnecting the segments to each other and without bridging between the segments so that the interstices and passageways throughout the batt remain substantially intact and unobstructed, said hydrophilic foam coating and its surface having a minute cellular structure which serves for producing a capillary type effect when contacted by water to wick the water throughout the pad along the surfaces of the elongate segments so as to substantially increase the evaporative efficiency of the pad over the pad prior to the coating thereof, and an open mesh net fabric intimately engaging said batt in surrounding relation to facilitate handling of the foam coated pad formed therefrom.

2. The evaporative cooler pad as claimed in claim 1 wherein said hydrophilic foam coating is no greater than about 1 to 2 mils in thickness.

3. The evaporative cooler pad as claimed in claim 1 wherein at least 85% of said elongate segments are at least two inches in length.

4. The evaporative cooler pad as claimed in claim 1 wherein he majority of said elongate segments are within the range of three to eight inches in length.

5. The evaporative cooler pad as claimed in claim 1 wherein the weight of the uncoated batt of elongate segments is about 18 ounces per square yard.

6. The evaporative cooler pad as claimed in claim 1 wherein the weight of the hydrophilic foam coating is less than the weight of the elongate segments.

7. The evaporative cooler pad as claimed in claim 6 wherein the weight of the hydrophilic foam coating is about 3 to 13 ounces per square yard.

8. The evaporative cooler pad as claimed in claim 1 wherein said open mesh net fabric has mesh openings of about 1/8 inch to 3/8 inches square.

9. The evaporative cooler pad of claim 1 wherein the hydrophilic foam of the cooler pad has a primary emulsifying ingredient selected from the group consisting of vinyl acetate homopolymer, a styrene butadiene polymer, nitrile polymer, and a polyvinyl resin.

10. The evaporative cooler pad of claim 9 wherein the hydrophilic foam comprises, by volume, from about 50 to 150 parts acetate homopolymer emulsion, from about 50 to about 150 parts polymeric acrylic emulsion, from about 5 to about 25 parts foam stabilizer, from about 0.5 to about 5 parts rewettable wetting and dispersing agent and from about 25 to about 200 parts water.

11. The evaporative cooler pad of claim 10 wherein the hydrophilic foam comprises, by volume, about 100 parts acetate homopolymer emulsion, about 75 parts polymeric acrylic emulsion, about 10 parts foam stabilizer, about 3 parts rewettable wetting and dispersing agent and about 100 parts water.

12. An evaporative cooler pad having opposing faces and comprising a substantially noncompressible batt of substantially uniformly distributed natural cellulosic lightweight elongate segments, oriented in generally horizontal planes extending substantially parallel to the opposing faces of the pad with the elongate segments in each plane extending in various directions with respect to each other and forming interconnecting interstices and passageways throughout the pad such that air directed toward the pad may flow generally freely therethrough from one face to the other of the pad, said pad also comprising a preformed hydrophilic foam directly coating substantially all the surfaces of the individual elongate segments, said hydrophilic foam coating having a thickness substantially less than the thickness of the elongate segments and no greater than about 1 to 2 mils in thickness so as to increase the cross-section of the segments without interconnecting the segments to each other and without bridging between the segments so that the interstices and passageways throughout the batt remain substantially intact and unobstructed, said hydrophilic foam coating and its surface having a minute cellular structure which serves for producing a capillary type effect when contacted by water to wick the water throughout the pad along the surfaces of the elongate segments so as to increase the evaporative efficiency of the pad at least about 50% over the pad prior to the coating thereof, and an open mesh net fabric intimately engaging said batt in surrounding relation to facilitate handling of the foam coated pad formed therefrom.

13. A method of substantially increasing the evaporative efficiency of an evaporative cooler pad formed from a noncompressible batt of substantially uniformly distributed natural cellulosic lightweight elongate segments, which are oriented in generally horizontal planes extending substantially parallel to the opposing faces of the pad with the elongate segments in each plane extending in various directions with respect to each other and forming interconnecting interstices and passageway throughout the pad and comprising the steps of applying a preformed hydrophilic foam directly onto a face of the batt while directing the batt through a pair of nip rolls to cause the applied foam to completely penetrate the batt thickness and to also squeeze and remove excess foam therefrom and so that the foam directly coats substantially the entire surface of each individual elongate segment and provides a coating thickness of substantially less than the thickness of the elongate segments to increase the cross-section of the segments without interconnecting the segments to each other and without bridging between the segments so that the interstices and passageways throughout the batt remain substantially intact and unobstructed, and heating and curing the foam coated batt and thereby forming an evaporative cooler pad which when contacted by water serves to wick the water throughout the pad along the surfaces of the elongate segments and which retains porosity to permit generally free air circulation therethrough.

14. The method as claimed in claim 13 wherein the hydrophilic foam is applied so that the final cured thickness of the foam is no greater than about 1 to 2 mils and the weight of the foam on the batt is about three to thirteen ounces per square yard.

* * * * *

UNITED STATES PATENT AND TRADEMARK OFFICE
CERTIFICATE OF CORRECTION

PATENT NO. : 4,902,449
DATED     : February 20, 1990
INVENTOR(S) : Claude Cary Hobbs It is certified that error appears in the above-identified patent and that said Letters Patent is hereby corrected as shown below:

In The Claims:

Col. 6, line 55, delete "he" and insert --the--.

Col 8, line 16, delete "passageway" and insert --passageways--.

Signed and Sealed this

Sixteenth Day of July, 1991

Attest:

HARRY F. MANBECK, JR.

Attesting Officer       Commissioner of Patents and Trademarks